(12) United States Patent
Lee et al.

(10) Patent No.: US 10,607,001 B2
(45) Date of Patent: Mar. 31, 2020

(54) WEB-BASED ELECTRONIC DOCUMENT SERVICE APPARATUS CAPABLE OF AUTHENTICATING DOCUMENT EDITING AND OPERATING METHOD THEREOF

(71) Applicant: HANCOM INC., Seongnam-si, Gyeonggi-do (KR)

(72) Inventors: Taeju Lee, Yongin-si (KR); Yongkyung Oh, Yongin-si (KR); Kyury Kim, Seoul (KR)

(73) Assignee: HANCOM INC., Seongnam-si, Gyeonggi-do (KR)

( * ) Notice: Subject to any disclaimer, the term of this patent is extended or adjusted under 35 U.S.C. 154(b) by 376 days.

(21) Appl. No.: 15/516,678

(22) PCT Filed: Jun. 29, 2016

(86) PCT No.: PCT/KR2016/006922
§ 371 (c)(1),
(2) Date: Apr. 4, 2017

(87) PCT Pub. No.: WO2018/004027
PCT Pub. Date: Jan. 4, 2018

(65) Prior Publication Data
US 2018/0268128 A1    Sep. 20, 2018

(51) Int. Cl.
*G06F 21/44* (2013.01)
*G06F 17/24* (2006.01)
(Continued)

(52) U.S. Cl.
CPC .............. *G06F 21/44* (2013.01); *G06F 17/22* (2013.01); *G06F 17/24* (2013.01); *G06F 21/33* (2013.01);
(Continued)

(58) Field of Classification Search
CPC .......... G06F 21/44; G06F 17/22; G06F 17/24; G06F 21/33; G06F 21/6281;
(Continued)

(56) References Cited

U.S. PATENT DOCUMENTS

| 6,397,261 | B1 * | 5/2002 | Eldridge | G06F 21/335 |
| | | | | 713/171 |
| 7,802,293 | B2 * | 9/2010 | Boyer | G06F 21/6245 |
| | | | | 726/6 |

(Continued)

FOREIGN PATENT DOCUMENTS

| EP | 1198762 B1 | 6/2010 |
| KR | 10-2001-0094087 A | 10/2001 |

(Continued)

OTHER PUBLICATIONS

Brun—"The Token Oriented Approach to Program Editing," Central Laboratory, SIGPLAN Notices, V20 #2, Feb. 1985, pp. 17-20.*

(Continued)

*Primary Examiner* — Luu T Pham
*Assistant Examiner* — James J Wilcox
(74) *Attorney, Agent, or Firm* — Park, Kim & Suh, LLC

(57) ABSTRACT

The present invention provides a web-based electronic document service apparatus, which is capable of authenticating the edit of a document, and an operating method thereof, in which when a predetermined authentication token is randomly issued and transmitted to a client terminal accessing for editing an electronic document based on a web, and then an editing command and an authentication token corresponding to the editing command are received from the client terminal, it is determined whether the received authentication token corresponds to the previously issued authentication token, so that it is possible to confirm whether the editing command received from the client terminal is the (Continued)

editing command generated by the true user, thereby providing a security mechanism.

5 Claims, 3 Drawing Sheets

(51) Int. Cl.
| | |
|---|---|
| *G06Q 10/10* | (2012.01) |
| *G06F 17/20* | (2006.01) |
| *G06F 21/33* | (2013.01) |
| *G06Q 50/18* | (2012.01) |
| *G06F 21/62* | (2013.01) |
| *G06F 17/22* | (2006.01) |
| *H04L 29/08* | (2006.01) |
| *G06Q 10/00* | (2012.01) |

(52) U.S. Cl.
CPC ......... *G06F 21/6281* (2013.01); *G06Q 10/00* (2013.01); *G06Q 10/10* (2013.01); *G06Q 50/18* (2013.01); *G06F 17/2247* (2013.01); *G06F 2221/2119* (2013.01); *G06F 2221/2129* (2013.01); *H04L 67/02* (2013.01)

(58) Field of Classification Search
CPC ......... G06F 17/2247; G06F 2221/2119; G06F 2221/2129; G06Q 10/00; G06Q 10/10; G06Q 50/18; G06Q 50/183; H04L 67/02
See application file for complete search history.

(56) References Cited

U.S. PATENT DOCUMENTS

| | | | | |
|---|---|---|---|---|
| 8,190,906 | B1* | 5/2012 | Elbeery ................... | G06F 21/34 713/156 |
| 8,316,237 | B1* | 11/2012 | Felsher ................. | H04L 9/0825 380/282 |
| 9,185,108 | B2* | 11/2015 | M'Raihi ................. | G06F 21/33 |
| 9,430,624 | B1* | 8/2016 | Mortensen .............. | G06F 21/31 |
| 10,013,544 | B1* | 7/2018 | Mortensen .............. | G06F 21/32 |
| 2002/0095570 | A1* | 7/2002 | Eldridge ............... | G06F 21/335 713/155 |
| 2005/0097060 | A1* | 5/2005 | Lee ........................ | G06Q 20/02 705/65 |
| 2005/0234943 | A1 | 10/2005 | Clarke | |
| 2007/0050635 | A1* | 3/2007 | Popp ..................... | H04L 9/0863 713/185 |
| 2007/0130463 | A1* | 6/2007 | Law ........................ | G06F 21/34 713/168 |
| 2008/0235175 | A1* | 9/2008 | Olive ................... | G06F 21/6272 |
| 2008/0235236 | A1* | 9/2008 | Olive ................... | G06F 16/93 |
| 2009/0287837 | A1* | 11/2009 | Felsher ................. | G06F 19/328 709/229 |
| 2009/0320119 | A1* | 12/2009 | Hicks .................... | G06F 16/958 726/9 |
| 2010/0306668 | A1* | 12/2010 | Williams, III ............ | H04L 9/32 715/741 |
| 2011/0314279 | A1* | 12/2011 | Ureche ................. | H04L 9/3228 713/167 |
| 2012/0204250 | A1* | 8/2012 | Anderson ............ | G06Q 10/107 726/9 |
| 2013/0073672 | A1* | 3/2013 | Ayed ......................... | G06F 8/61 709/217 |
| 2013/0159021 | A1* | 6/2013 | Felsher ................. | G06F 19/328 705/3 |
| 2013/0282589 | A1* | 10/2013 | Shoup ..................... | G06F 21/34 705/67 |
| 2014/0115332 | A1 | 4/2014 | Crosbie et al. | |
| 2014/0129645 | A1 | 5/2014 | Mo | |
| 2014/0237580 | A1* | 8/2014 | Kato ....................... | H04L 63/08 726/9 |
| 2014/0273965 | A1* | 9/2014 | Raleigh ................. | H04W 12/04 455/411 |
| 2015/0033028 | A1* | 1/2015 | Dietrich .............. | H04L 63/0853 713/178 |
| 2015/0134600 | A1* | 5/2015 | Eisner ..................... | H04L 51/04 707/608 |
| 2015/0215316 | A1* | 7/2015 | Zeljkovic .............. | H04L 9/3231 726/6 |
| 2017/0004154 | A1* | 1/2017 | Blumenau ............ | G06F 16/219 |
| 2017/0118193 | A1* | 4/2017 | Shmulevich ............ | H04L 63/08 |
| 2017/0171189 | A1* | 6/2017 | Byszio ................. | H04L 63/0815 |
| 2017/0295017 | A1* | 10/2017 | Hong ........................ | H04L 9/32 |
| 2017/0310487 | A1* | 10/2017 | Lu .......................... | H04L 9/0618 |
| 2017/0353314 | A1* | 12/2017 | Steeves ................... | H04L 9/006 |
| 2017/0353445 | A1* | 12/2017 | Steeves ................... | H04L 9/006 |
| 2017/0353457 | A1* | 12/2017 | Steeves ................... | H04L 9/006 |
| 2018/0267679 | A1* | 9/2018 | Lee ........................ | G06F 3/0484 |
| 2018/0267944 | A1* | 9/2018 | Lee ....................... | G06F 17/2247 |
| 2018/0365444 | A1* | 12/2018 | Barday ............... | H04L 63/08 |
| 2019/0129889 | A1* | 5/2019 | Lee ..................... | G06F 16/1767 |
| 2019/0190717 | A1* | 6/2019 | Beric ................... | H04L 9/3228 |
| 2019/0200218 | A1* | 6/2019 | Redberg ............. | H04L 63/0807 |
| 2019/0266350 | A1* | 8/2019 | Barday ............... | G06F 16/9535 |

FOREIGN PATENT DOCUMENTS

| | | |
|---|---|---|
| KR | 10-2008-0005785 A | 1/2008 |
| KR | 10-2010-0050892 A | 5/2010 |
| KR | 10-2014-0055071 A | 5/2014 |
| KR | 10-2015-0091527 A | 8/2015 |
| KR | 10-2015-0115850 A | 10/2015 |
| WO | 2009/158108 A2 | 12/2009 |
| WO | 2014/120624 A1 | 8/2014 |

OTHER PUBLICATIONS

International Search Report in International Application No. PCT/KR2016/006922 dated Mar. 29, 2017 with English translation, 5 pages.

Korean Office Action in Appln. No. 10-2017-7000817 dated Feb. 19, 2017 with English Translation.

* cited by examiner

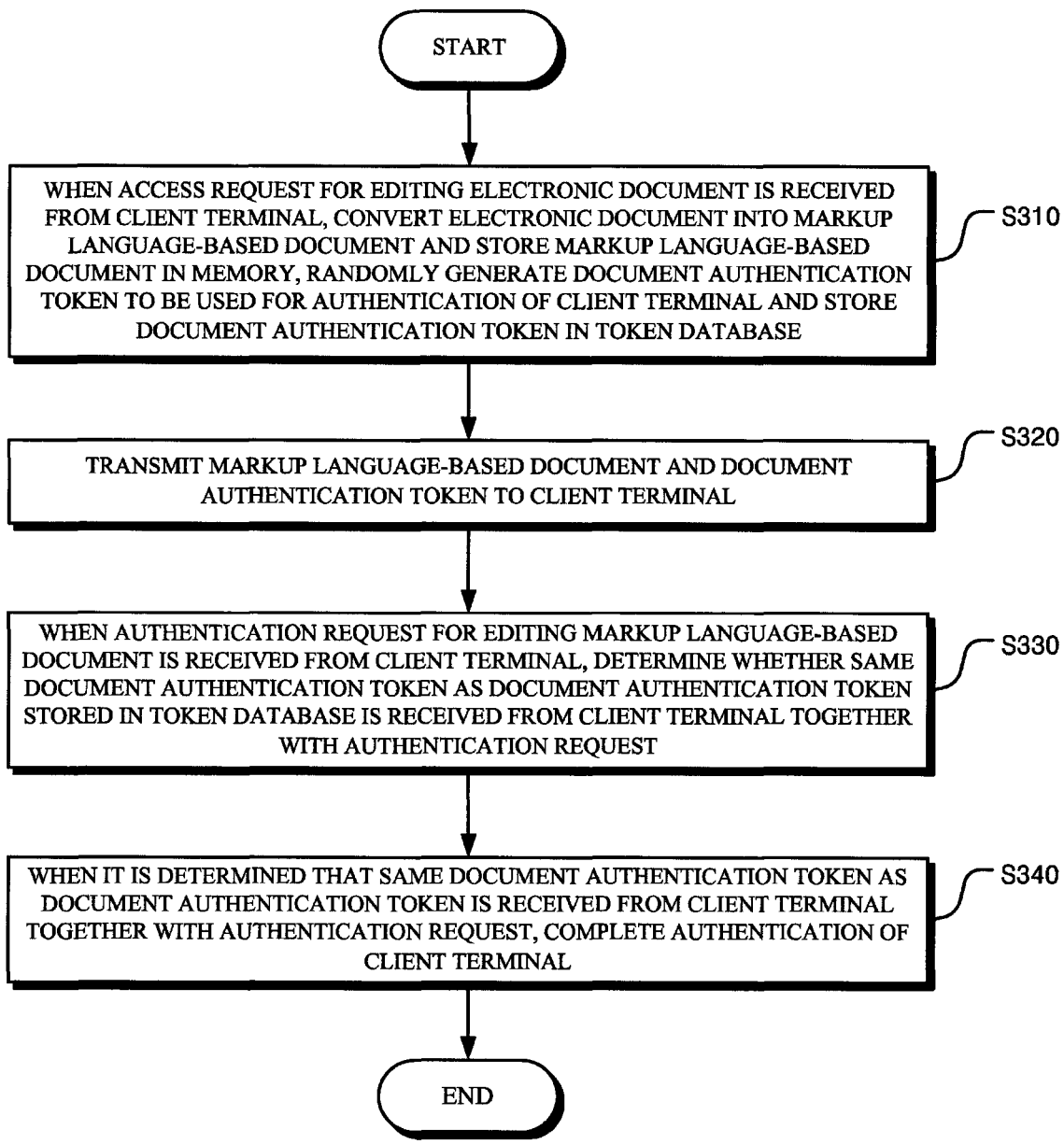

WEB-BASED ELECTRONIC DOCUMENT SERVICE APPARATUS CAPABLE OF AUTHENTICATING DOCUMENT EDITING AND OPERATING METHOD THEREOF

CROSS-REFERENCE TO RELATED APPLICATIONS

This application is the National Stage filing under 35 U.S.C. 371 of International Application No. PCT/KR2016/006922, filed on Jun. 29, 2016, the contents of which are all hereby incorporated by reference herein in their entirety.

TECHNICAL FIELD

The present invention relates to a technology for a web-based electronic document service apparatus, which supports writing and editing of an electronic document based on a web, and an operating method thereof.

BACKGROUND ART

Recently, according to the wide supply of electronic terminal devices, such as a computer, a smart phone, or a tablet PC, various kinds of electronic document-related programs, with which a user may read, write, and edit an electronic document by using the electronic terminal device, have been released.

The electronic document-related programs include a word processor supporting basic writing and editing of a document, a spread sheet assisting data input, calculation, and a data management, and presentation programs assisting a presentation of a speaker.

In the related art, in order for a user to read, write, and edit an electronic document by utilizing an electronic terminal device, the user needs to directly install the electronic document-related programs in the electronic terminal device, drive the electronic document-related programs, and read or write and edit the electronic document.

However, recently, a high speed Internet environment is established and a wireless Internet environment, in which a user is capable of accessing the Internet anytime and anywhere, is established, and an electronic document-related service is provided to an electronic terminal device that is a client terminal through a server in a remote place, so that a web-based electronic document service, which enables a user to read, write, and edit an electronic document anytime and anywhere even though the user does not install a predetermined electronic document-related program in an electronic terminal device, appears.

The web-based electronic document service supports various client terminals to access an electronic document service providing server, and then to read, write, and edit an electronic document through a browser installed in the client terminals, and supports various client terminals to act simultaneous cooperation in real time for the electronic document, so that the web-based electronic document service is mainly utilized in a company, a group, and the like.

The web-based electronic document service supports a user to read, write, and edit an electronic document through a browser installed in a client terminal if the client terminal can access the Internet, without a necessity for installing a predetermined electronic document writing program in the client terminal, so that it is possible to secure mobility for a user, thereby gradually increasing individual users.

Commonly, in order to support a client terminal connected through a network to perform editing of an electronic document through a browser, the web-based electronic document service is operated in a method, in which when an original electronic document is converted into a markup language-based document and the converted document is provided to the client terminal, the client terminal performs editing of the markup language-based document through the browser.

In relation to this, in the web-based electronic document service, a user participating in the edit of the electronic document performs the edit of the electronic document through a network, so that it is necessary to introduce a security technology for, when an editing command for the electronic document is applied by the user, verifying that the corresponding editing command is applied by the true user, who is currently participating in the edit of the electronic document, not by a third person, who is not related to the edit of the electronic document.

SUMMARY OF THE INVENTION

Technical Problem

The present invention has been made in an effort to provide a web-based electronic document service apparatus, which is capable of authenticating the edit of a document, and an operating method thereof, in which when a predetermined authentication token is randomly issued and transmitted to a client terminal accessing for editing an electronic document based on a web, and then an editing command and an authentication token corresponding to the editing command are received from the client terminal, it is determined whether the received authentication token corresponds to the previously issued authentication token, so that it is possible to confirm whether the editing command received from the client terminal is the editing command generated by the true user, thereby providing a security mechanism.

Technical Solution

An exemplary embodiment of the present invention provides a web-based electronic document service apparatus, which is capable of authenticating an edit of a document, the web-based electronic document service apparatus including: a document authentication token generating unit configured to, when an access request for editing an electronic document is received from a client terminal, convert the electronic document into a markup language-based document and stores the markup language-based document in a memory, and randomly generate a document authentication token to be used for authentication of the client terminal, and store the document authentication token in a token database; a document transmitting unit configured to transmit the markup language-based document and the document authentication token to the client terminal; a document authentication token determining unit configured to, when an authentication request for editing the markup language-based document is received from the client terminal, determine whether the same document authentication token as the document authentication token stored in the token database is received from the client terminal together with the authentication request; and a client authenticating unit configured to, when it is determined that the same document authentication token, which is the same as the document authentication token, is received from the client terminal together with the authentication request, complete the authentication of the client terminal.

Another exemplary embodiment of the present invention provides a method of operating a web-based electronic document service apparatus, which is capable of authenticating an edit of a document, the method including: when an access request for editing an electronic document is received from a client terminal, converting the electronic document into a markup language-based document and storing the markup language-based document in a memory, and randomly generating a document authentication token to be used for authentication of the client terminal, and storing the document authentication token in a token database; transmitting the markup language-based document and the document authentication token to the client terminal; when an authentication request for editing the markup language-based document is received from the client terminal, determining whether the same document authentication token as the document authentication token stored in the token database is received from the client terminal together with the authentication request; and when it is determined that the same document authentication token, which is the same as the document authentication token, is received from the client terminal together with the authentication request, completing the authentication of the client terminal.

Advantageous Effects

According to the web-based electronic document service apparatus, which is capable of authenticating the edit of a document, and the operating method thereof, when a predetermined authentication token is randomly issued and transmitted to a client terminal accessing for editing an electronic document based on a web, and then an editing command and an authentication token corresponding to the editing command are received from the client terminal, it is determined whether the received authentication token corresponds to the previously issued authentication token, so that it is possible to confirm whether the editing command received from the client terminal is the editing command generated by the true user, thereby providing a security mechanism.

BRIEF DESCRIPTION OF THE DRAWINGS

FIG. 3 is a flowchart illustrating a method of operating a web-based electronic document service apparatus capable of authenticating an edit of a document according to an exemplary embodiment of the present invention.

DETAILED DESCRIPTION

Figure 1:
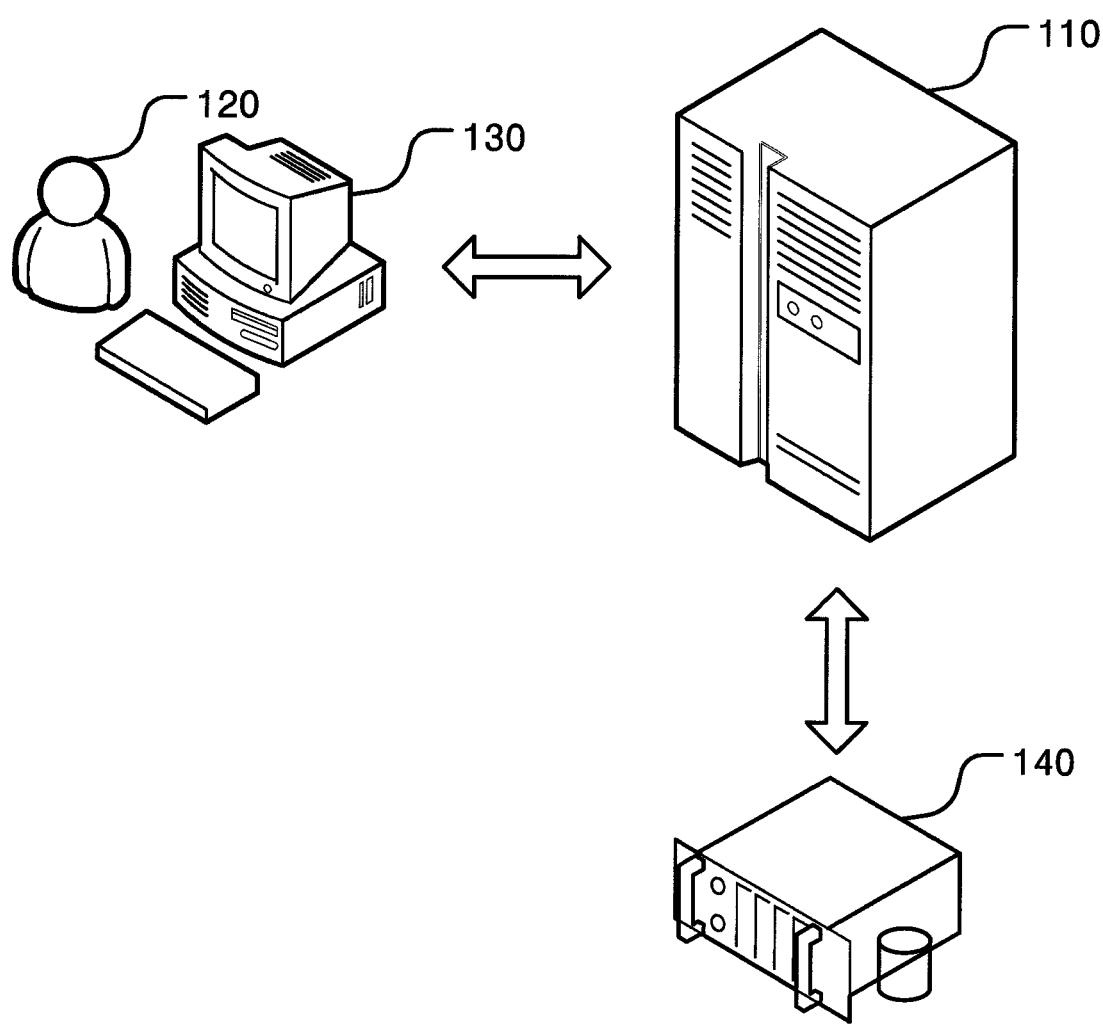
FIG. 1 is a conceptual diagram schematically illustrating an entire system for describing a web-based electronic document service apparatus capable of authenticating an edit of a document according to an exemplary embodiment of the present invention.

The present invention may be variously modified and have various exemplary embodiments, so that specific embodiments will be illustrated in the drawings and described in detail in the detailed description. However, it is not intended to limit the present invention to the specific embodiments, and it will be appreciated that the present invention includes all modifications, equivalences, or substitutions included in the spirit and the technical scope of the present invention. In the description of respective drawings, similar reference numerals designate similar elements.

In the case where an element is referred to as being "connected" or "accessed" to other element, it should be understood that the element may not only be directly connected or accessed to the other element, but also there may exist another element between them. In contrast, when one element is "directly coupled to" or "directly connected to" another element, it should be understood that there is no intervening element present.

Terms used in the present application are used only to describe specific exemplary embodiments, and are not intended to limit the present invention. As used herein, the singular forms are intended to include the plural forms as well, unless the context clearly indicates otherwise. In the present application, it will be appreciated that terms "including" and "having" are intended to designate the existence of characteristics, numbers, steps, operations, constituent elements, and elements described in the specification or a combination thereof, and do not exclude a possibility of the existence or addition of one or more other characteristics, numbers, steps, operations, constituent elements, and elements, or a combination thereof in advance.

All terms used herein including technical or scientific terms have the same meanings as meanings which are generally understood by those skilled in the art unless they are differently defined. Terms defined in generally used dictionary shall be construed that they have meanings matching those in the context of a related art, and shall not be construed in ideal or excessively formal meanings unless they are clearly defined in the present application.

Hereinafter, exemplary embodiments of the present invention will be described in detail with reference to the accompanying drawings.

FIG. 1 is a conceptual diagram schematically illustrating an entire system for describing a web-based electronic document service apparatus capable of authenticating an edit of a document according to an exemplary embodiment of the present invention.

FIG. 1 illustrates a web-based electronic document service apparatus 110 capable of authenticating an edit of a document according to an exemplary embodiment of the present invention, a client terminal 130, and a token database 140.

First, when the web-based electronic document service apparatus 110 capable of authenticating the edit of the document receives an access request for editing an electronic document stored in a predetermined document storage from the client terminal 130 of a user 120, the web-based electronic document service apparatus 110 capable of authenticating the edit of the document may convert the electronic document into a markup language-based document and store the markup language-based document in a memory, randomly generate a document authentication token to be used for the authentication of the client terminal 130, and store the document authentication token in the token database 140.

Here, the markup language-based document means a document formed of a markup language, such as a hypertext markup language (HTML) or an eXtensible markup language (XML), readable through a browser installed in the client terminal 130.

For example, when the access request for the electronic document is received from the client terminal 130 in the state where the electronic document having an extension of "hwp", "docx", or the like is stored in a predetermined document storage, the web-based electronic document service apparatus 110 capable of authenticating the edit of the document may extract the electronic document from the document storage, convert the electronic document into a document based on a markup language, such as an HTML, and store the converted markup language-based document in the memory.

In this case, according to the exemplary embodiment of the present invention, the document storage, in which the electronic document is stored, may be embedded inside the web-based electronic document service apparatus 110 capable of authenticating the edit of the document, and may also be formed of a stand alone-based device separated from the web-based electronic document service apparatus 110 capable of authenticating the edit of the document.

When the markup language-based document and the document authentication token are completely generated as described above, the web-based electronic document service apparatus 110 capable of authenticating the edit of the document may transmit the markup language-based document and the document authentication token to the client terminal 130.

In this case, when the client terminal 130 receives the markup language-based document and the document authentication token, the client terminal 130 may render and display the markup language-based document on a screen through a browser installed in the client terminal 130, and transmit the document authentication token while transmitting an authentication request for editing the markup language-based document to the web-based electronic document service apparatus 110 capable of authenticating the edit of the document.

When the client terminal 130 transmits the authentication request and the document authentication token to the web-based electronic document service apparatus 110 capable of authenticating the edit of the document, the web-based electronic document service apparatus 110 capable of authenticating the edit of the document may determine whether the document authentication token received from the client terminal 130 is the same as a document authentication token stored in the token database 140.

When it is determined that the document authentication token received from the client terminal 130 is the same as the document authentication token stored in the token database 140, the web-based electronic document service apparatus 110 capable of authenticating the edit of the document may determine that the authentication request is received from a true user and complete the authentication for the client terminal 130.

Then, the web-based electronic document service apparatus 110 capable of authenticating the edit of the document may randomly generate a one-time token to be used for editing authentication for an editing command, which is to be generated for the markup language-based document by the client terminal 130, store the one-time token in the token database 140, and transmit the one-time token to the client terminal 130.

In this case, when the editing for the markup language-based document, which has been displayed through the browser of the client terminal 130, is generated by the user 120 after the one-time token is received from the web-based electronic document service apparatus 110 capable of authenticating the edit of the document, the client terminal 130 may reflect the corresponding editing matter to the markup language-based document, generate an editing command directing so that the editing is reflected to the markup language-based document, and transmit the one-time token and the editing command to the web-based electronic document service apparatus 110 capable of authenticating the edit of the document.

In this case, according to the exemplary embodiment of the present invention, when an editing for the markup language-based document is generated by the user 120, the client terminal 130 may generate a time stamp value based on time information on a time point, at which the editing is generated, designate the time stamp value as unique serial data corresponding to the editing, and insert the unique serial data into data forming the editing command to generate the editing command including the unique serial data.

In this case, when the editing command including the unique serial data is generated, the client terminal 130 may encrypt the one-time token by using the unique serial data as an encryption key, and transmit the editing command and the encrypted one-time token to the web-based electronic document service apparatus 110 capable of authenticating the edit of the document.

When the client terminal 130 transmits the editing command and the encrypted one-time token to the web-based electronic document service apparatus 110 capable of authenticating the edit of the document as described above, the web-based electronic document service apparatus 110 capable of authenticating the edit of the document extract the unique serial data included in the editing command from the editing command received from the client terminal, and decode the encrypted one-time token by using the extracted unique serial data as a decoding key.

Then, the web-based electronic document service apparatus 110 capable of authenticating the edit of the document may compare whether the decoded one-time token corresponds to a one-time token stored in the token database 140, and determine whether the same one-time token as the one-time token stored in the token database 140 is received together with the editing command from the client terminal 130.

When it is determined that the decoded one-time token received from the client terminal 130 is the same as the one-time token stored in the token database 140, the web-based electronic document service apparatus 110 capable of authenticating the edit of the document may determine that the editing command is received from the true user and reflect the editing according to the editing command received from the client terminal 130 to the markup language-based document stored in the memory.

In this case, when the editing according to the editing command is completely reflected to the markup language-based document, the web-based electronic document service apparatus 110 capable of authenticating the edit of the document may delete the one-time token stored in the token database 140 from the token database 140, and when the one-time token is completely deleted, the web-based electronic document service apparatus 110 capable of authenticating the edit of the document may randomly generate another one-time token to be used for editing authentication for an additional editing command, which is to be generated after the editing command, and store the another one-time token in the token database 140.

Then, the web-based electronic document service apparatus 110 capable of authenticating the edit of the document may transmit the another one-time token to the client terminal 130, and when an additional editing is generated for the markup language-based document by the user 120, the client terminal 130 may generate an additional editing command according to the additional editing and then transmit the corresponding additional editing command and the another one-time token to the web-based electronic document service apparatus 110 capable of authenticating the edit of the document to support the web-based electronic document service apparatus 110 capable of authenticating the edit of the document to determine whether the additional editing command is generated by the true user based on the another one-time token.

By the method, when the web-based electronic document service apparatus 110 capable of authenticating the edit of the document randomly issues and transmits a one-time token to the client terminal 130 and then receives an editing command and the one-time token corresponding to the editing command from the client terminal 130, the web-based electronic document service apparatus 110 capable of authenticating the edit of the document determines whether the received one-time token corresponds to a one-time token stored in the token database 140, reflects the corresponding editing command to an electronic document only when the editing command received from the client terminal 130 is an editing command generated by a true user, and issues and transmits another one-time token to the client terminal 130 when the corresponding editing command is reflected to the electronic document, to authenticate integrity of each editing command every time whenever an editing command is generated by the user 120, thereby enhancing security in providing the web-based electronic document service.

Figure 2:
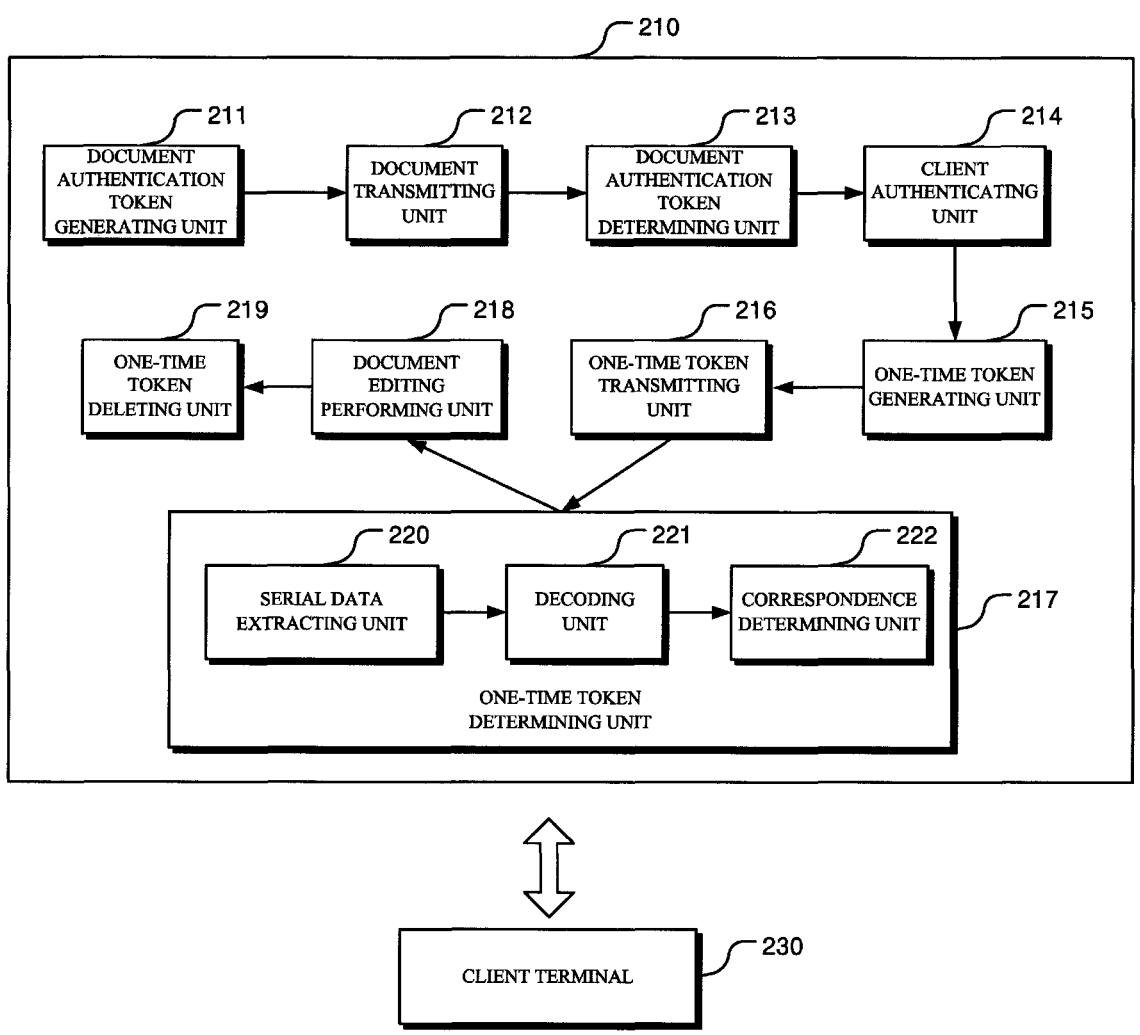
FIG. 2 is a diagram illustrating a structure of a web-based electronic document service apparatus capable of authenticating an edit of a document according to an exemplary embodiment of the present invention.

FIG. 2 is a diagram illustrating a structure of a web-based electronic document service apparatus capable of authenticating an edit of a document according to an exemplary embodiment of the present invention.

Referring to FIG. 2, a web-based electronic document service apparatus 210 capable of authenticating an edit of a document according to an exemplary embodiment of the present invention includes a document authentication token generating unit 211, a document transmitting unit 212, a document authentication token determining unit 213, and a client authenticating unit 214.

When an access request for editing an electronic document is received from a client terminal 230, the document authentication token generating unit 211 converts the electronic document into a markup language-based document and stores the converted markup language-based document in a memory, randomly generates a document authentication token to be used for authentication of the client terminal 230, and stores the document authentication token in a token database (not illustrated).

The document transmitting unit 212 transmits the markup language-based document and the document authentication token to the client terminal 230.

When an authentication request for editing the markup language-based document is received from the client terminal 230, the document authentication token determining unit 213 determines whether the document authentication token, which is the same as the document authentication token stored in the token database, is received from the client terminal 230 together with the authentication request.

When it is determined that the document authentication token, which is the same as the document authentication token, is received from the client terminal 230 together with the authentication request, the client authenticating unit 214 completes the authentication of the client terminal 230.

In this case, according to the exemplary embodiment of the present invention, the web-based electronic document service apparatus 210 capable of authenticating the edit of the document may further include a one-time token generating unit 215, a one-time token transmitting unit 216, a one-time token determining unit 217, and a document editing performing unit 218.

When the authentication of the client terminal 230 is completed, the one-time token generating unit 215 randomly generates a one-time token to be used for editing authentication for an editing command, which is to be generated for the markup language-based document, and stores the one-time token in the token database.

The one-time token transmitting unit 216 transmits the one-time token to the client terminal 230.

When an editing command related to the edit of the markup language-based document is received from the client terminal 230, the one-time token determining unit 217 determines whether the one-time token, which is the same as the one-time token stored in the token database, is received from the client terminal 230 together with the editing command.

When it is determined that the one-time token, which is the same as the one-time token, is received from the client terminal 230 together with the editing command, the document editing performing unit 218 reflects an editing according to the editing command to the markup language-based document stored in the memory.

In this case, according to the exemplary embodiment of the present invention, the web-based electronic document service apparatus 210 capable of authenticating the edit of the document may further include a one-time token deleting unit 219.

When the editing according to the editing command is completely reflected to the markup language-based document, the one-time token deleting unit 219 deletes the one-time token stored in the token database from the token database.

In this case, when the one-time token is completely deleted, the one-time token generating unit 215 may randomly generate another one-time token to be used for editing authentication for an additional editing command, which is to be generated after the editing command, and store the another one-time token in the token database, and the one-time token transmitting unit 216 may transmit the another one-time token to the client terminal 230.

According to the exemplary embodiment of the present invention, when an edit of the markup language-based document is generated by a user of the client terminal 230 after the one-time token is received from the web-based electronic document service apparatus 210 capable of authenticating the edit of the document, the client terminal 230 may generate unique serial data corresponding to the editing and generate the editing command including the unique serial data, encrypt the one-time token by using the unique serial data as an encryption key, and then transmit the editing command and the encrypted one-time token to the web-based electronic document service apparatus 210 capable of authenticating the edit of the document.

In this case, the one-time token determining unit 217 may include a serial data extracting unit 220, a decoding unit 221, and a correspondence determining unit 222.

When the editing command and the encrypted one-time token are received from the client terminal 230, the serial data extracting unit 220 extracts the unique serial data included in the editing command from the editing command.

The decoding unit 221 decodes the encrypted one-time token by using the extracted unique serial data as a decoding key.

The correspondence determining unit 222 compares whether the decoded one-time token corresponds to the one-time token stored in the token database, and determines whether the same one-time token as the one-time token stored in the token database is received from the client terminal 230 together with the editing command.

In this case, according to the exemplary embodiment of the present invention, when an edit of the markup language-based document is generated by the user of the client terminal 230 after the one-time token is received from the web-based electronic document service apparatus 210 capable of authenticating the edit of the document, the client terminal 230 may generate a time stamp value based on time information on a time point, at which the editing is generated, as the unique serial data.

In the above, the web-based electronic document service apparatus 210 capable of authenticating the edit of the document according to the exemplary embodiment of the present invention has been described with reference to FIG. 2. Here, the configuration of the web-based electronic document service apparatus 210 capable of authenticating the edit of the document according to the exemplary embodiment of the present invention may correspond to the configuration of the web-based electronic document service apparatus 110 capable of authenticating the edit of the document described with reference to FIG. 1, so that a detailed description thereof will be omitted.

FIG. 3 is a flowchart illustrating a method of operating a web-based electronic document service apparatus capable of authenticating an edit of a document according to an exemplary embodiment of the present invention.

In operation S310, when an access request for editing an electronic document is received from a client terminal, the web-based electronic document service apparatus capable of authenticating the edit of the document converts the electronic document into a markup language-based document and stores the markup language-based document in a memory, and randomly generates a document authentication token to be used for authentication of the client terminal and stores the document authentication token in a token database.

In operation S320, the web-based electronic document service apparatus capable of authenticating the edit of the document transmits the markup language-based document and the document authentication token to the client terminal.

In operation S330, when an authentication request for editing the markup language-based document is received from the client terminal, the web-based electronic document service apparatus capable of authenticating the edit of the document determines whether the same document authentication token as the document authentication token stored in the token database is received from the client terminal together with the authentication request.

In operation S340, when it is determined that the same document authentication token as the document authentication token stored in the token database is received from the client terminal together with the authentication request, the web-based electronic document service apparatus capable of authenticating the edit of the document completes the authentication of the client terminal.

In this case, according to the exemplary embodiment of the present invention, the method of operating the web-based electronic document service apparatus capable of authenticating the edit of the document may further include: when the authentication of the client terminal is completed, randomly generating a one-time token to be used for editing authentication for an editing command, which is to be generated for the markup language-based document, and storing the one-time token in the token database, transmitting the one-time token to the client terminal; when an editing command related to the edit of the markup language-based document is received from the client terminal, determining whether the same one time token as the one-time token stored in the token database is received from the client terminal together with the editing command; and when it is determined that the same one time token as the one-time token is received from the client terminal together with the editing command, reflecting the editing according to the editing command to the markup language-based document stored in the memory.

In this case, according to the exemplary embodiment of the present invention, the method of operating the web-based electronic document service apparatus capable of authenticating the edit of the document may further include: when the editing according to the editing command is completely reflected to the markup language-based document, deleting the one-time token stored in the token database from the token database; when the one-time token is completely deleted, randomly generating another one-time token to be used for editing authentication for an additional editing command, which is to be generated after the editing command, and storing the another one-time token in the token database; and transmitting the another one-time token to the client terminal.

According to the exemplary embodiment of the present invention, when an edit of the markup language-based document is generated by a user of the client terminal after the one-time token is received from the web-based electronic document service apparatus capable of authenticating the edit of the document, the client terminal may generate unique serial data corresponding to the editing and generate the editing command including the unique serial data, encrypt the one-time token by using the unique serial data as an encryption key, and then transmit the editing command and the encrypted one-time token to the web-based electronic document service apparatus capable of authenticating the edit of the document.

In this case, the determining whether the same one time token as the one-time token is received may include: when the editing command and the encrypted one-time token are received from the client terminal, extracting the unique serial data included in the editing command from the editing command; decoding the encrypted one-time token by using the extracted unique serial data as a decoding key; and comparing whether the decoded one-time token corresponds to the one-time token stored in the token database, and determining whether the same one-time token as the one-time token stored in the token database is received from the client terminal together with the editing command.

In this case, according to the exemplary embodiment of the present invention, when an edit of the markup language-based document is generated by the user of the client terminal after the one-time token is received from the web-based electronic document service apparatus capable of authenticating the edit of the document, the client terminal may generate a time stamp value based on time information on a time point, at which the editing is generated, as the unique serial data.

In the above, the method of operating the web-based electronic document service apparatus capable of authenticating the edit of the document according to the exemplary embodiment of the present invention has been described with reference to FIG. 3. Here, the method of operating the web-based electronic document service apparatus capable of authenticating the edit of the document according to the exemplary embodiment of the present invention may correspond to the configurations of the operations of the web-based electronic document service apparatuses 110 and 210 capable of authenticating the edit of the document described with reference to FIGS. 1 and 2, so that a detailed description thereof will be omitted.

The method of operating the web-based electronic document service apparatus capable of authenticating the edit of the document according to the exemplary embodiment of the present invention may be implemented by a computer program stored in a storage medium for executing the method through a cooperation with a computer.

The method of operating the web-based electronic document service apparatus capable of authenticating the edit of the document according to the exemplary embodiment of the present invention may be implemented in a form of a program command executable through various computer means and may be recorded in a computer readable medium. The computer readable medium may include one or a combination of a program command, a data file, and a data structure. The program command recorded in the medium may be specially designed and configured for the present invention, or may be publicly known to and used by those skilled in the computer software field. Examples of the computer readable recording medium include a magnetic medium, such as a hard disk, a floppy disk, or a magnetic tape, an optical medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available.

As described above, the present invention has been described by the specific matters, limited embodiments, and drawings, such as specific constituent elements, but these are provided for helping general understanding of the present invention, and the present invention is not limited to the exemplary embodiments, and those skilled in the art will appreciate that various modifications, additions and substitutions are possible from the disclosure.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. A web-based electronic document service apparatus, which is capable of authenticating an edit of a document, the web-based electronic document service apparatus comprising:

a document authentication token generating unit configured to, when an access request for an electronic document is received from an unauthenticated client terminal, convert the electronic document into a markup language-based document and store the markup language-based document in a memory, and randomly generate a document authentication token to be used for authentication of the unauthenticated client terminal, and store the document authentication token in a token database;

a document transmitting unit configured to transmit the markup language-based document and the document authentication token to the unauthenticated client terminal in response to the access request;

a document authentication token determining unit configured to, when an authentication request is received from the unauthenticated client terminal, determine whether the same document authentication token as the document authentication token stored in the token database is received from the unauthenticated client terminal together with the authentication request;

a client authenticating unit configured to, when it is determined that the document authentication token, which is the same as the document authentication token, is received from the unauthenticated client terminal together with the authentication request, authenticate the unauthenticated client terminal;

a one-time token generating unit configured to, when the authentication is completed, randomly generate a one-time token to be used for authenticating an editing command, which is to be generated by an authenticated client terminal for an editing of the markup language-based document, and store the one-time token in the token database;

a one-time token transmitting unit configured to transmit the one-time token to the authenticated client terminal after the authentication is completed;

a one-time token determining unit configured to, when the editing command is received from the authenticated client terminal, determine whether the one-time token, which is the same as the one-time token stored in the token database, is received from the authenticated client terminal together with the editing command;

a document editing performing unit configured to, when it is determined that the one-time token, which is the same as the one-time token, is received from the authenticated client terminal together with the editing command, reflect the editing according to the editing command on the markup language-based document stored in the memory, wherein when the editing of the markup language-based document is performed by the authenticated client terminal after the authenticated client terminal receives the one-time token from the web-based electronic document service, the authenticated client terminal generates unique serial data representing the performed editing and generates the editing command including the unique serial data, encrypts the one-time token by using the unique serial data as an encryption key, and then transmits the editing command, the unique serial data included in the editing command, and the encrypted one-time token to the web-based electronic document service apparatus, and wherein the one-time token determining unit includes:

a serial data extracting unit configured to, when the editing command and the encrypted one-time token are received from the authenticated client terminal, extract the unique serial data from the editing command;

a decoding unit configured to decode the encrypted one-time token by using the extracted unique serial data as a decoding key; and a correspondence determining unit configured to compare whether the decoded one-time token corresponds to the one-time token stored in the token database, and determine whether the same one-time token as the one-time token stored in the token database is received from the authenticated client terminal together with the editing command; and a one-time token deleting unit configured to, when the editing according to the editing command is completely reflected on the markup language-based document, delete the one-time token from the token database, wherein when the one-time token is completely deleted, the one-time token generating unit randomly generates another one-time token to be used for authenticating an additional editing command, which is to be generated after the editing command, and stores the another one-time token in the token database, and the one-time token transmitting unit transmits the another one-time token to the authenticated client terminal.

2. The web-based electronic document service apparatus of claim 1, wherein the authenticated client terminal generates a time stamp value based on a time point, at which the editing is generated, as the unique serial data.

3. A method of operating a web-based electronic document service apparatus, which is capable of authenticating an edit of a document, the method comprising:

when an access request for an electronic document is received from an unauthenticated client terminal, converting the electronic document into a markup language-based document and storing the markup language-based document in a memory, and randomly generating a document authentication token to be used for authentication of the unauthenticated client terminal, and storing the document authentication token in a token database;

transmitting the markup language-based document and the document authentication token to the unauthenticated client terminal in response to the access request;

when an authentication request is received from the unauthenticated client terminal, determining whether the same document authentication token as the document authentication token stored in the token database is received from the unauthenticated client terminal together with the authentication request;

when it is determined that the same document authentication token, which is the same as the document authentication token, is received from the unauthenticated client terminal together with the authentication request, authenticating the unauthenticated client terminal;

when the authentication is completed, randomly generating a one-time token to be used for authenticating an editing command, which is to be generated by an authenticated client terminal for an editing of the markup language-based document, and storing the one-time token in the token database;

transmitting the one-time token to the authenticated client terminal after the authentication is completed;

when the editing command is received from the authenticated client terminal, determining whether the one-time token, which is the same as the one-time token stored in the token database, is received from the authenticated client terminal together with the editing command;

when it is determined that the one-time token, which is the same as the one-time token, is received from the authenticated client terminal together with the editing command, reflecting the editing according to the editing command on the markup language-based document stored in the memory, wherein when the editing of the markup language-based document is performed by the authenticated client terminal after the authenticated client terminal receives the one-time token from the web-based electronic document service, the authenticated client terminal generates unique serial data representing the performed editing and generates the editing command including the unique serial data, encrypts the one-time token by using the unique serial data as an encryption key, and then transmits the editing command, the unique serial data included in the editing command, and the encrypted one-time token to the web-based electronic document service apparatus, and wherein the determining whether the one-time token, which is the same as the one-time token, is received includes:

when the editing command and the encrypted one-time token are received from the authenticated client terminal, extracting the unique serial data from the editing command;

decoding the encrypted one-time token by using the extracted unique serial data as a decoding key; and comparing whether the decoded one-time token corresponds to the one-time token stored in the token database, and determining whether the same one-time token as the one-time token stored in the token database is received from the authenticated client terminal together with the editing command;

when the editing according to the editing command is completely reflected on the markup language-based document, deleting the one-time token stored from the token database;

when the one-time token is completely deleted, randomly generating another one-time token to be used for authenticating an additional editing command, which is to be generated after the editing command, and storing the another one-time token in the token database; and transmitting the another one-time token to the authenticated client terminal.

4. The method of claim 3, wherein the authenticated client terminal generates a time stamp value based on a time point, at which the editing is generated, as the unique serial data.

5. A non-transitory computer readable recording medium in which a program for executing a method of operating a web-based electronic document service apparatus, which is capable of authenticating an edit of a document is recorded, the method comprising:

when an access request for an electronic document is received from an unauthenticated client terminal, converting the electronic document into a markup language-based document and storing the markup language-based document in a memory, and randomly generating a document authentication token to be used for authentication of the unauthenticated client terminal, and storing the document authentication token in a token database;

transmitting the markup language-based document and the document authentication token to the unauthenticated client terminal in response to the access request;

when an authentication request is received from the unauthenticated client terminal, determining whether the same document authentication token as the document authentication token stored in the token database is received from the unauthenticated client terminal together with the authentication request;

when it is determined that the same document authentication token, which is the same as the document authentication token, is received from the unauthenticated client terminal together with the authentication request, authenticating the unauthenticated client terminal;

when the authentication is completed, randomly generating a one-time token to be used for authenticating an editing command, which is to be generated by an authenticated client terminal for an editing of the markup language-based document, and storing the one-time token in the token database;

transmitting the one-time token to the authenticated client terminal after the authentication is completed;

when the editing command is received from the authenticated client terminal, determining whether the one-time token, which is the same as the one-time token stored in the token database, is received from the authenticated client terminal together with the editing command;

when it is determined that the one-time token, which is the same as the one-time token, is received from the authenticated client terminal together with the editing command, reflecting the editing according to the editing command on the markup language-based document stored in the memory, wherein when the editing of the markup language-based document is performed by the authenticated client terminal after the authenticated client terminal receives the one-time token from the web-based electronic document service, the authenticated client terminal generates unique serial data representing the performed editing and generates the editing command including the unique serial data, encrypts the one-time token by using the unique serial data as an encryption key, and then transmits the editing command, the unique serial data included in the editing command, and the encrypted one-time token to the web-based electronic document service apparatus, and wherein the determining whether the one-time token, which is the same as the one-time token, is received includes:

when the editing command and the encrypted one-time token are received from the authenticated client terminal, extracting the unique serial data from the editing command;

decoding the encrypted one-time token by using the extracted unique serial data as a decoding key; and comparing whether the decoded one-time token corresponds to the one-time token stored in the token database, and determining whether the same one-time token as the one-time token stored in the token database is received from the authenticated client terminal together with the editing command;

when the editing according to the editing command is completely reflected on the markup language-based document, deleting the one-time token stored from the token database;

when the one-time token is completely deleted, randomly generating another one-time token to be used for authenticating an additional editing command, which is to be generated after the editing command, and storing the another one-time token in the token database; and transmitting the another one-time token to the authenticated client terminal.

* * * * *